United States Patent
Heilig (10) Patent No.: US 6,349,965 B1
(45) Date of Patent: Feb. 26, 2002

(54) VEHICLE SAFETY DEVICE FOR THE PROTECTION OF THE FEET OF AN OCCUPANT

(75) Inventor: Alexander Heilig, Wissgoldingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/474,221

(22) Filed: Dec. 29, 1999

(30) Foreign Application Priority Data

Dec. 30, 1998 (DE) ..................................... 298 23 235 U (51) Int. Cl.⁷ .............................................. B60R 21/02
(52) U.S. Cl. ...................................... 280/748; 280/750
(58) Field of Search ............................... 280/748, 750, 280/752; 180/90.6; 296/75

(56) References Cited

U.S. PATENT DOCUMENTS

| | | | | |
|---|---|---|---|---|
| 2,862,761 A | * | 12/1958 | Scheidegger | 296/75 |
| 3,426,615 A | * | 2/1969 | Strauss | 296/75 |
| 4,955,658 A | * | 9/1990 | Graves | 296/75 |
| 5,168,771 A | * | 12/1992 | Fujimori | 74/564 |
| 5,183,308 A | * | 2/1993 | Koga et al. | 296/75 |
| 6,073,515 A | * | 6/2000 | Elton et al. | 74/564 |

FOREIGN PATENT DOCUMENTS

| | | |
|---|---|---|
| DE | 3741881 | 7/1988 |
| DE | 19541607 | 5/1997 |

* cited by examiner

Primary Examiner—J. J. Swann
Assistant Examiner—L. Lum
(74) Attorney, Agent, or Firm—Tarolli, Sundheim, Covell, Tummino & Szabo L.L.P.

(57) ABSTRACT

The invention relates to a vehicle safety device for the protection of the feet of an occupant, in particular of a driver. The vehicle safety device comprises an adjusting device and a section of a floor of the vehicle in a region of the occupant's feet. The section is a movable section and can be coupled with the adjusting device so as to be moved by the device relative to the feet.

29 Claims, 4 Drawing Sheets

VEHICLE SAFETY DEVICE FOR THE PROTECTION OF THE FEET OF AN OCCUPANT

TECHNICAL FIELD

The invention relates to a vehicle safety device for the protection of the feet of an occupant, in particular of a driver.

BACKGROUND OF THE INVENTION

The feet of the occupant are exposed to high stresses in a frontal impact, because they can slip off from a pedal, can be stressed by the pedals moving into the footspace of the vehicle, or can be jammed between pedals and the so-called splashboard. The splashboard is a part of the vehicle floor which codetermines the footspace of the front occupants of the vehicle. It adjoins the substantially horizontal section of the vehicle floor and usually runs obliquely upwards toward the engine chamber. The splashboard is also known as the chamber wall. For protecting the occupant's feet, in particular the feet of the driver, which are exposed to greater dangers, a foot gas bag is proposed, which is intended to partially fill the footspace in the case of an accident. In normal driving operation, the gas bag is not intended to project into the footspace, because it could be damaged, but is to emerge from its covering in the case of an accident. The accommodating of the gas bag under a wall which is able to be torn open is very costly and in addition the unfolding behavior is very difficult to determine in advance, with the pedals which stand in the way making the predeterminability additionally difficult.

BRIEF SUMMARY OF THE INVENTION

The invention provides a vehicle safety device which is constructed more simply and the protective effect of which does not depend on several background conditions, such as the unfolding direction of a gas bag, for example. This is achieved in a vehicle safety device which comprises an adjusting device and a section of a floor of the vehicle in a region of the occupant's feet. The section is a movable section and can be coupled with the adjusting device so as to be moved by the device relative to the feet. In contrast to a gas bag which must emerge from its covering, provision is made according to the invention that a section of the vehicle floor itself can be moved. The movement of the floor has the advantage that it can be moved along a given path, e.g. by means of a guide. The movable section of the vehicle floor is in addition a defined, usually rigid surface, in which also the danger does not exist that it deforms in an undefined manner on displacement. In addition, the danger does not exist that, as in a foot gas bag, it is destroyed by pointed heels, because the stable vehicle floor is the part of the safety device which has direct contact with the occupant's shoes.

The movable section can be the splashboard section of the vehicle floor and/or the substantially horizontal section of the floor on which the feet or shoes of the occupant, more precisely his heels or the heels of the shoe, rest.

Preferably the movable section of the vehicle floor is provided with a double vehicle floor. The latter has a rigid outer floor part and a movable inner floor part.

Connecting levers between the floor parts can provide the path of movement of the inner floor part and, furthermore, can serve as deformation elements. Also, the movable floor part itself can of course be deformed in a predeterminable manner in the case of an accident.

In particular on the driver side, the movable vehicle floor is very effective. When the splashboard section is moved up to the pedals, in fact the pedal treads and the displaced section can substantially form one surface. The feet can thereby no longer come between the pedals and the splashboard section and also can no longer slip off from the pedals.

The embodiments of the invention operate by two different principles. The first principle makes provision that the adjusting device is constructed for normal driving operation and permits a reversible adjustment of the movable section for adaptation to the sitting position of the occupant. The adjusting device is therefore not triggered only in the case of an accident, but rather the vehicle floor, for example for a small occupant, is adjusted towards him, so that his footspace is smaller than for a large occupant. Through the adjustment of the horizontal section, for example the angular position between foot and lower leg can be optimized, which with a small occupant, owing to his sitting position, hitherto was always distinctly more unfavorable than with a large occupant. Small occupants in fact generally step very strongly from above onto the pedals and have to raise their heel if, for example, they wish to change between brake pedal and accelerator. The angle between the foot and the lower leg, in addition, is small, which increases the risk of injury. The second principle provides for a movement of a section of the vehicle floor in the case of an accident. It is important in particular here that the splashboard section is moved so far to the pedals that the feet can no longer be squeezed between the splashboard section and the pedals.

To supplement the above-mentioned first principle, an even better protective effect can be achieved when this safety device according to the invention is provided with adjustable pedals. The adjustable pedals are intended to make possible for normal driving operation a reversible displacement of the pedals to and away from the vehicle seat, so that the position of the pedals can be adapted to the occupant, his size or sitting position. The adjustability of the vehicle floor in combination with the adjustability of the pedals allows small and also very large occupants to optimize their sitting position. Hitherto, the pedals were the fixed point in the vehicle, to which the sitting position had to be oriented. This led not only to an unfavorable position of the legs and feet, but also of the upper body. Hitherto, small occupants in fact sit too close to the steering wheel, so that the unfolding steering wheel gas bag can form a potential danger. By the safety device according to the invention, the distance to the steering wheel can be optimized, because the pedals and also the vehicle floor are adapted to the sitting position, which is codetermined by the size of: the occupant. This also has the advantage that with pedals displaced in the direction toward the seat, together with the splashboard section, more space is available for the deformation of the front part of the vehicle, until parts penetrate into the footspace. The adjustment of the vehicle floor can take place manually, together with the adjustment of the seat, horizontally and/or vertically, mechanically or electrically. The pedals are preferably to be moved obliquely upwards in the direction toward the steering wheel, so that drivers of differing size always have the same angle between foot and lower leg.

For the above-mentioned second principle, it is advantageous if a linear drive (e.g. a conventional linear tensioner or a spring action) displaces the movable section.

Furthermore, however, it is also possible to provide a gas bag for example between the inner and outer floor part, which gas bag displaces the inner floor part.

The displacement of a section of the floor can go along with an uncoupling of the pedals, e.g. by the movable section uncoupling the pedals from their suspension or pulling off the pedals at the end of its adjusting path.

DETAILED DESCRIPTION OF THE PREFERRED EMBODIMENTS

Figure 1:
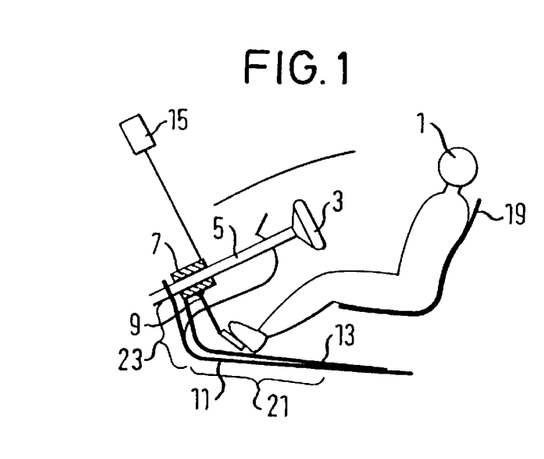
FIG. 1 shows a schematic side view of the vehicle equipped with the vehicle safety device according to the invention, the device designed for being adjustable in the normal driving operation and being adapted to a large occupant in FIG. 1.
Figure 2:
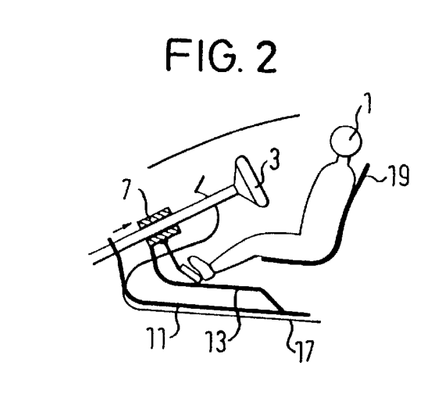
FIG. 2 shows the device shown in FIG. 1 with a small occupant.

In FIG. 1, a vehicle safety device for the protection of the feet of a driver 1 is illustrated. The vehicle steering wheel is represented by 3 and the steering shaft together with external mounting is represented by 5. The term steering shaft is used hereinbelow both for the rotating inner part, the actual shaft, and also for the tubular mounting in which the inner part sits. The steering shaft serves for the mounting of a vehicle safety device which is displaceable along it obliquely upwards toward the occupant and back obliquely downwards. The vehicle safety device comprises a sliding carriage 7 surrounding the steering shaft and sliding on it, and pedals 9 fastened thereon (brake pedal, accelerator and clutch if applicable) and also a double vehicle floor in the region of the occupant's feet. The vehicle floor comprises a rigid outer floor part 11 and also a movable inner floor part 13. The floor part 13 is adapted in its shape to that of the outer floor part 11. In the case of a large occupant, as is shown in FIG. 1, the inner floor part 13 lies almost or even directly against the outer floor part 11. If, however, an average large or a small occupant, as illustrated in FIG. 2, wishes to drive the same vehicle, the sliding carriage 7 and with it the pedals 9 and the inner floor part 13 can be displaced obliquely upwards along the steering shaft 5.

The displacement can take place for example by means of an electric drive 15, which is illustrated diagrammatically in FIG. 1, or by means of a Bowden cable 17 which is coupled with the driver's seat 19. The Bowden cable 19 can lead to an adjustment of the sliding carriage 7 with the horizontal and/or vertical adjustment of the vehicle seat.

A separate guide can also be provided as guide for pedals 9 and floor part 13; the steering shaft 5 does not have to be used compulsorily as a guide. The electric motor 15 in connection with the sliding carriage 7 or the Bowden cable 17 in connection with the sliding carriage 7 serves as adjusting device for the pedals 9 and the inner floor part 13.

The vehicle floor in the region of the occupant's feet consists substantially of two sections continuing into each other, namely a substantially horizontal section 21, on which the heels of the driver 1 rest, and a splashboard section 23, also known as the fire wall, adjoining thereon obliquely upwards in the direction of the engine, which section 23 extends upwards behind the pedals 9.

In the embodiment illustrated in FIGS. 1 and 2, the sections 21 and 23 of the inner floor part 13 are connected with each other in one piece, and they are adjusted jointly obliquely upwards and, reversibly, obliquely downwards, coordinated with the sitting position (hence with the size of the occupant) before driving off. If the safety device for the very small occupant shown in FIG. 2 were set as illustrated in FIG. 1, the occupant would have to push his seat 19 very far forward. He would sit very close to the steering wheel 3. His lower legs would run very obliquely downwards and assume a distinctly smaller angle to the feet than in the optimized position illustrated in FIG. 2. The gas bag, which is accommodated in the steering wheel 3, could injure the occupant, in addition with a displacement of the splashboard section 23 or a displacement of the pedals 9, injuries would easily occur to the foot owing to the small angle of foot to lower leg.

Through the safety device, extremely large occupants and also extremely small occupants can always achieve an optimum sitting position, so that the angle of the lower leg to the horizontal and in particular the angle between the lower leg and the feet can be optimized or can not become too small. The driving safety is in fact distinctly increased for small occupants, because hitherto they have often had to lift their feet from the vehicle floor, when they wanted to actuate a different pedal, which impaired the reaction time. For large occupants, on the other hand, it was easy for example to merely take the foot slightly from the pedal and to turn it about the heel still resting on the vehicle floor, in order to quickly step on the adjacent pedal.

The inner floor part 13 is relatively rigid and can not be destroyed by the occupant. For small occupants, in addition, the advantage results that the feet and the entire sitting position lie further to the rear than in conventional vehicles, so that in the case of a frontal impact a greater crumple zone is available, until finally deformation of the splashboard section 23 or a displacement of the pedals 9 occurs.

Figure 3:
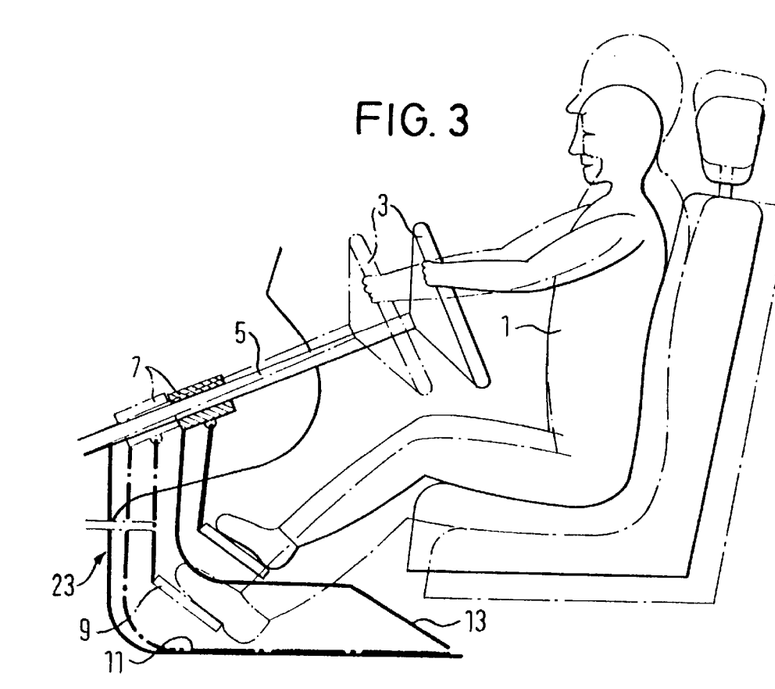
FIG. 3 shows a vehicle safety device according to the invention, modified slightly compared with FIGS. 1 and 2.

The embodiment illustrated in FIG. 3 corresponds substantially to that illustrated in FIG. 2. In FIG. 3, the positions of the safety device with large and with small occupants are illustrated in one figure.

Compared with the embodiment illustrated in FIGS. 1 and 2, in this embodiment the steering wheel 3 is vertically adjustable and also in addition, due to a telescope-like mounting which is not shown, is constructed so as to be axially displaceable in relation to the steering shaft 5. Also in this embodiment, the sliding carriage 7 sits on the steering shaft 5. Pedals 9 and the splashboard section 23 are fastened to it. Here, also, it can be seen that the angles of the lower legs and of the feet to the horizontal are approximately identical in the case of large and small occupants.

Figure 4:
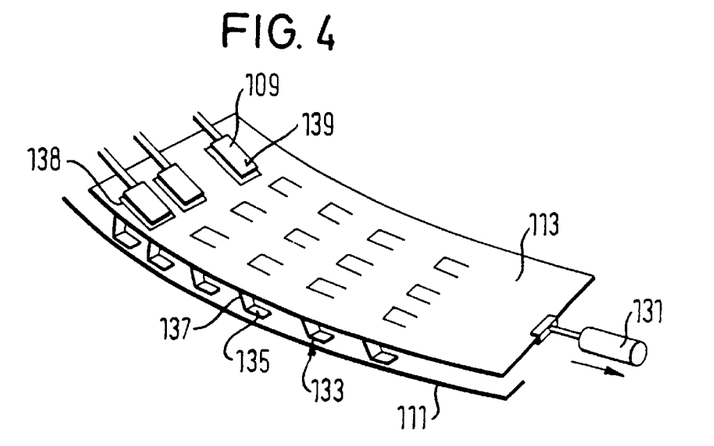
FIG. 4 shows a safety device according to the invention, operating according to a different principle compared with the first figures, which device is only activated in the case of an accident.

Whereas the embodiments illustrated in FIGS. 1 to 3 make possible a reversible adjustment of the pedals and of the section of the vehicle floor close to the driver's feet for normal driving operation, the embodiment illustrated in FIG. 4 is provided for activation only in the case of a crash.

Figure 5:
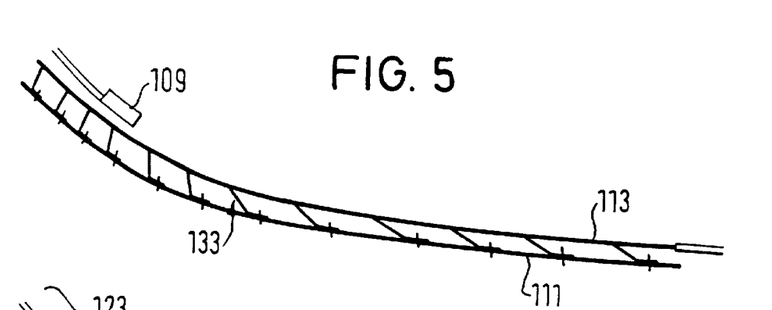
FIG. 5 shows a diagrammatic side view of the device according to FIG. 4 before activation of the safety device.

Also this embodiment of the vehicle safety device operates with a double vehicle floor in the region of the occupant's feet. The displaceable section of the vehicle floor likewise begins in front of the seat and extends to behind the pedals obliquely upwards. In contrast to the one previously described, the safety device has no adjustable pedals. It comprises a rigid inner floor part 113, a rigid outer floor part 111, a linear tensioner 131, which is fastened to the inner floor part 113 and extends under the seat of the occupant and represents a linear drive. The inner floor part 113 is connected with the outer floor part 111 by means of numerous connecting levers 133 arranged distributed on the entire underside of the inner floor part 113. The connecting levers 133 are pivotally fastened plastic strips on the underside of the inner floor part 113, which have an angled base 135, by which they are fastened to the upper face of the outer floor part 111. Between the base 135 and the section 137 adjoining thereto a hinge is formed. In the non-actuated state (cf. FIG. 5) the connecting levers 133 are largely placed obliquely, because the inner floor part 113 lies almost against the outer floor part 111. The pedals are designated by 109.

In the case of a frontal impact, the linear tensioner 131 is actuated, which moves the inner floor part 113 to the right, i.e. toward the driver's seat. The connecting levers 133 provide the path of movement of the inner floor part 113. The floor part 113 moves upwards and also toward the vehicle seat. The connecting levers 133 straighten up and stabilize the inner floor part 113. The inner floor part is moved so far that it strikes onto the pedals 109. Around the pedals, the inner floor part, as can be seen in FIG. 4, has elastic regions 138 adapted to the shape of the pedals and their treads 139. When the inner floor part 113 strikes onto the pedals in the region of the splashboard section 123, it yields in the region 138. After the complete displacement of the inner floor part 113, a continuous transition results between the pedal treads 139 and the splashboard section 123. The occupant's feet can no longer slip off from the pedals 109 and strike at high speed onto the splashboard section 123, as is the case in conventional vehicles. Furthermore, the occupant's feet can also no longer become jammed between the pedals 109 and the splashboard section 123. The connecting levers 133 are constructed such that with a deformation of the outer floor part 111, i.e. in the case of a very severe accident, they serve as deformation elements by being plastically deformable in line with specific objectives.

Figure 6:
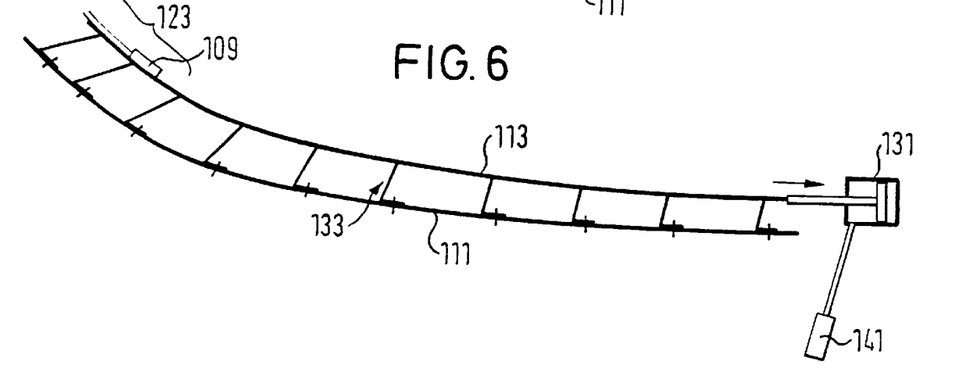
FIG. 6 shows a diagrammatic side view according to FIG. 5, after the safety device has been activated.

The linear tensioner 131 illustrated in this embodiment is coupled with a gas generator 141 (cf. FIG. 6), which makes possible a rapid displacement of the inner floor part 113. The linear tensioner 131 can be constructed as a linear tensioner which is able to be used for a belt tensioner, as is known in vehicle safety technology. The inner floor part 113 can also have a recess in the region 138, i.e. around the pedals or can have a predeterminable tear line. The embodiment according to FIG. 6 can be varied by replacing the gas generator 141 by a pneumatic or hydraulic energy source enabling a cylinder 131 to move the floor part 113 upon request of the occupant.

Figure 7:
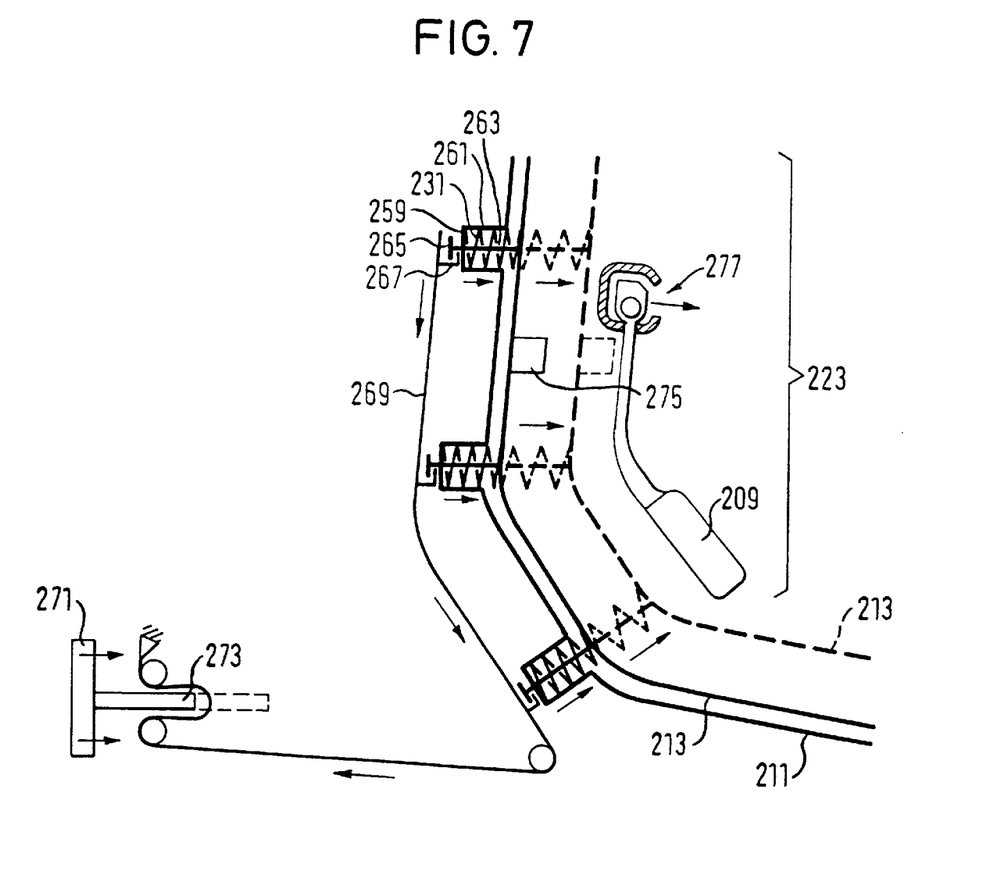
FIG. 7 shows a diagrammatic side view of a different embodiment of the safety device according to the invention, which is only activated in the case of an accident.

The embodiment illustrated in FIG. 7 operates without a linear tensioner. Several prestressed compression springs 231 are provided as linear drive, which sit in pockets 261 in the outer floor part 211. The inner floor part 213 has formed-on bearing pins 263, which extend through the springs 231 and through the base 259 of the pockets 261. The bearing pins 263 have at their free end an extension 265, which has a hook 267 of a release device engaging behind it. The release device consists of a band 269 which runs over deflection rollers into the front part of the vehicle. In the case of an accident, a slider 271 is displaced in the arrow direction. The band 269 is displaced in the arrow direction by a slider extension 273 which acts on the band 269. The hooks 267 are displaced so far until the bearing pins 263 are no longer arrested. Through the force of the springs 231 the inner floor part 213 is displaced abruptly in the arrow direction on the one hand upwards and on the other hand horizontally to the vehicle seat. So that the various directions of movement of the springs do not mutually impede each other, bend regions can be provided on the inner floor part 213. With the displacement of the splashboard section 223 approximately horizontally to the vehicle seat into the position shown by broken lines, an extension 275 on the inner floor part 213 strikes onto the pedals 209 close to their suspension 277. The pedals are thereby torn from their deformably constructed suspension 277 and uncoupled from it, so that they can not move toward the occupant's feet in the case of a severe accident.

Figure 8:
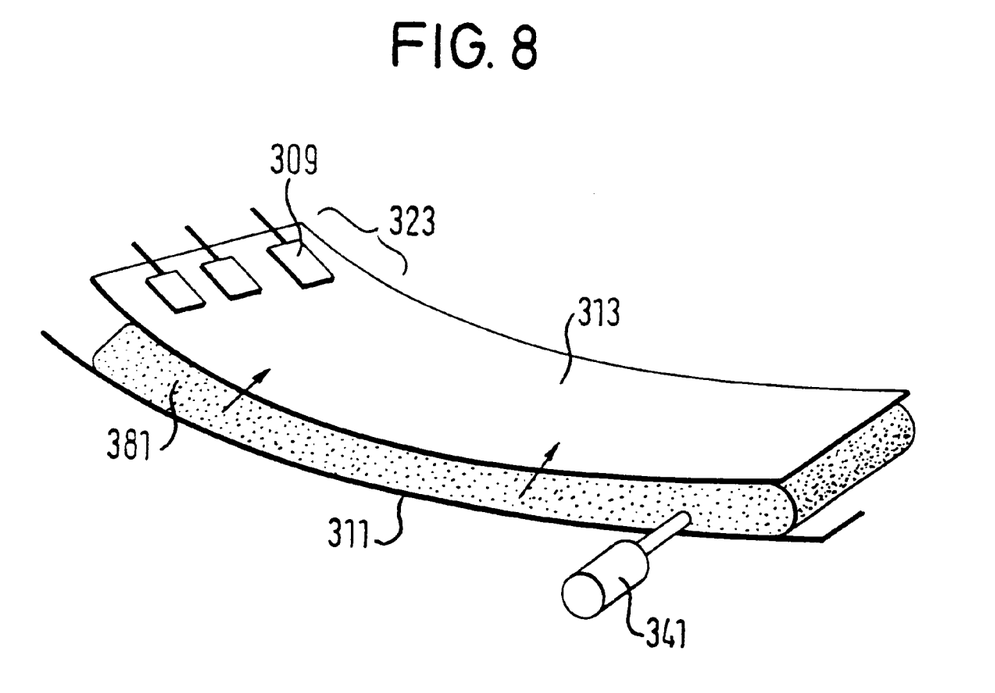
FIG. 8 shows a perspective view of a further embodiment of the safety device, which is likewise only activated in the case of an accident.

The embodiment shown in FIG. 8 likewise operates with a double vehicle floor, an elongated gas bag 381 having a large area being accommodated between the inner floor part 313 and the outer floor part 311. The inner floor part 313 is a rigid plastic body having a large area, which also can not be pierced by the pointed heels of ladies' shoes. In the case of an accident and during normal driving operation, the gas bag 381 is inflated by means of a gas generator 341 or a pneumatic source 341, respectively. The inner floor part 313 is thereby partly moved upwards and partly moved toward the vehicle seat, so that a distance no longer exists between the pedals 309 and the splashboard section 323. The gas bag 381 can be fastened to the inner and/or outer floor part 313, 311 and have limiting straps in its interior, which delimit the expansion of the gas bag 381.

According to the illustrated adjusting devices in the form of the linear tensioner 131 (FIGS. 4 to 6), of the prestressed springs 231 (FIG. 7) and of the gas bag 381 together with gas generator 341 (FIG. 8), other adjusting devices are also conceivable, such as for example the coupling of the band 269 shown in FIG. 7 directly with the inner floor part 213.

What is claimed is:

1. A vehicle safety device for protection of an occupant's feet, in particular of a driver's feet, comprising:
    an adjusting device;
    a movable section of a floor of said vehicle in a region of said occupant's feet, said movable section being coupled with said adjusting device and being movable by said adjusting device relative to said feet;
    said adjusting device, in a driving operation in which the vehicle is not experiencing an accident, reversibly adjusting said movable section of said vehicle floor for adaptation thereof to a sitting position of said occupant, said adjusting device being coupled with a vehicle seat and being adjustable with at least one of a horizontal and a vertical adjustment of said vehicle seat.

2. The vehicle safety device according to claim 1, wherein said movable section comprises a rigid outer floor part and a movable inner floor part.

3. The vehicle safety device according to claim 2, wherein connecting levers are arranged between said outer and inner floor parts, said connecting levers determining a path of movement of said inner floor part.

4. The vehicle safety device according to claim 1, wherein said adjusting device can be actuated by said occupant.

5. The vehicle safety device according to claim 1, wherein said adjusting device is activated in the case of an accident and moves said movable section toward said vehicle seat.

6. A vehicle safety device for protection of an occupant's feet, in particular of a driver's feet, comprising:

an adjusting device including a carrier slidably mounted to a vehicle part;

a movable section of a floor of said vehicle in a region of said occupant's feet, said movable section being coupled with said adjusting device so as to be moved by said device relative to said feet; and pedals fastened to said carrier;

said carrier being reversibly adjustable so that said pedals as a whole are positioned toward a vehicle seat and away from said vehicle seat for adaptation to a sitting position of said occupant.

7. A vehicle safety device for protection of an occupant's feet, in particular of a driver's feet, comprising:

an adjusting device including a carrier slidably mounted to a vehicle part;

a movable section of a floor of said vehicle in a region of said occupant's feet, said movable section being coupled with said adjusting device so as to be moved by said device relative to said feet; and pedals fastened to said carrier;

said carrier being reversibly adjustable so that said pedals as a whole are positioned toward a vehicle seat and away from said vehicle seat for adaptation to a sitting position of said occupant;

said pedals, upon adjusting said carrier, being movable obliquely upwards towards said occupant and movable obliquely downwards away from said occupant.

8. A vehicle safety device for protection of an occupant's feet, in particular of a driver's feet, comprising:

an adjusting device;

a movable section of a floor of said vehicle in a region of said occupant's feet, said movable section being coupled with said adjusting device and movable by said adjusting device relative to said feet;

pedals, said pedals being reversibly adjustable toward a vehicle seat and away from said vehicle seat for adaptation to a sitting position of said occupant;

said pedals on adjusting being movable obliquely upwards towards said occupant and movable obliquely downwards away from said occupant; and one of a steering shaft and a steering shaft with a mounting, said pedals being mounted displaceably on one of said steering shaft and said mounting of said steering shaft.

9. The vehicle safety device according to claim 8, wherein said movable section comprises a splashboard section.

10. The vehicle safety device according to claim 8, wherein said movable section comprises a substantially horizontal section on which said feet of the occupant rest.

11. The vehicle safety device according to claim 8, wherein said movable section comprises a substantially rigid part with a substantially horizontal section on which said feet of said occupant rest and a splashboard section adjoining thereto and extending obliquely upwards.

12. The vehicle safety device according to claim 8, wherein said movable section comprises a rigid outer floor part and a movable inner floor part.

13. The vehicle safety device according to claim 8, wherein connecting levers are arranged between said outer and inner floor parts, said connecting levers determining a path of movement of said inner floor part.

14. The vehicle safety device according to claim 13, wherein said connecting levers are deformable in the case of an accident and of a deformation of said outer floor part.

15. The vehicle safety device according to claim 8, wherein said adjusting device, in a non-accidental driving operation, reversibly adjusting said movable section of said vehicle floor for adaptation to a sitting position of said occupant.

16. The vehicle safety device according to claim 15, wherein said adjusting device can be actuated by said occupant.

17. The vehicle safety device according to claim 8, wherein said adjusting device is activated in case of an accident and moves said movable section toward said vehicle seat.

18. A vehicle safety device for protection of an occupant's feet, in particular of a driver's feet, comprising:

an adjusting device including a carrier slidably mounted to a vehicle part;

a movable section of a floor of said vehicle in a region of said occupant's feet, said movable section being coupled with said adjusting device so as to be moved by said device relative to said feet; and pedals fastened to said carrier;

said carrier being reversibly adjustable so that said pedals as a whole are positioned toward a vehicle seat and away from said vehicle seat for adaptation to a sitting position of said occupant;

said pedals, upon adjusting said carrier, being movable obliquely upwards toward said occupant and movable downwards away from said occupant;

said movable section comprising a splashboard section, said splashboard section being fastened to said carrier, so that said movable section and said pedals are moved together.

19. The vehicle safety device according to claim 18, wherein said movable section comprises a rigid outer floor part and a movable inner floor part.

20. The vehicle safety device according to claim 19, wherein connecting levers are arranged between said outer and inner floor parts, said connecting levers determining a path of movement of said inner floor part.

21. The vehicle safety device according to claim 18, wherein said adjusting device, in a non-accidental operation, reversibly adjusting said movable section of said vehicle floor for adaptation to a sitting position of said occupant.

22. The vehicle safety device according to claim 21, wherein said adjusting device can be actuated by said occupant.

23. A vehicle safety device for protection of an occupant's feet, in particular of a driver's feet, comprising:

an adjusting device;

a movable section of a floor of said vehicle in a region of said occupant's feet, said movable section being coupled with said adjusting device and movable by said adjusting device relative to said feet;

said movable section moving along an adjustment path, and at least one pedal coupled to a suspension, said at least one pedal and said suspension being connected to said movable section, said movable section at an end of the adjustment path engages said at least one pedal to uncouple said at least one pedal from said suspension.

24. A vehicle safety device, provided on a driver side where pedals are provided, for protection of a driver's feet, said device comprising:

an adjusting device; and a movable splashboard section of said vehicle in a region of said occupant's feet, said movable splashboard section being coupled with said adjusting device and movable by said adjusting device relative to said feet;

said adjusting device being activated in case of an accident and moving said movable section toward a vehicle seat;

said movable section being moved in case of an accident up to said pedals, so that said feet of said driver can not move between said pedals and said splashboard section.

25. The vehicle safety device according to claim 24, wherein said adjusting device, in a non-accidental driving operation, reversibly adjusting said movable section of said vehicle floor for adaptation to a sitting position of said occupant.

26. The vehicle safety device according to claim 25, wherein said adjusting device can be actuated by said occupant.

27. The vehicle safety device according to claim 24, wherein said adjusting device has a linear drive which displaces said movable section.

28. The vehicle safety device according to claim 24, wherein said adjusting device has a gas bag arranged under said movable section of said vehicle floor.

29. A vehicle safety device for protection of an occupant's feet, in particular of a driver's feet, comprising:

an adjusting device; and a movable section of a floor of said vehicle in a region of said occupant's feet, said movable section being coupled with said adjusting device and being movable by said adjusting device relative to said feet;

said adjusting device being activated in case of an accident and moving said movable section toward a vehicle seat;

said adjusting device including a gas bag arranged under said movable section of said vehicle floor.

* * * * *

UNITED STATES PATENT AND TRADEMARK OFFICE
CERTIFICATE OF CORRECTION

PATENT NO. : 6,349,965 B1  
DATED : February 26, 2002  
INVENTOR(S) : Alexander Heilig It is certified that error appears in the above-identified patent and that said Letters Patent is hereby corrected as shown below:

<u>Column 7,</u>
Line 59, after "claim", change "8" to -- 12 --.

Signed and Sealed this

Third Day of December, 2002

JAMES E. ROGAN
*Director of the United States Patent and Trademark Office*